June 22, 1954 W. D. HOUGHTON 2,681,992

TIME AVERAGING DEFLECTION SIGNAL GENERATOR

Filed March 31, 1949

INVENTOR
William D. Houghton
BY
[signature]
ATTORNEY

Patented June 22, 1954

2,681,992

UNITED STATES PATENT OFFICE 2,681,992

TIME AVERAGING DEFLECTION SIGNAL GENERATOR

William Davis Houghton, Port Jefferson, N. Y., assignor to Radio Corporation of America, a corporation of Delaware Application March 31, 1949, Serial No. 84,643

4 Claims. (Cl. 250—36)

This invention relates to synchronized signal generators of the type adapted to maintain a periodically recurrent output signal independently of applied synchronizing signals but responsive to applied synchronizing signals to establish and maintain a synchronous relationship therewith.

More particularly, the present invention relates to an improved form of deflection signal generator for cathode ray beam deflection systems and finds particular usefulness as a sawtooth deflection signal generator for television receiver deflection systems.

In beam deflection circuits for present day television receivers it is common practice to utilize AFC (automatic frequency control) or time averaging circuit action in the frequency and phase control of the developed deflection signal. The method of time averaging synchronizing control is inherently less responsive to spurious noise signals than were the earlier types of synchronizing systems deriving their control through the direct application of synchronizing pulses to an oscillator or multi-vibrator. However, to achieve time averaging action, it has been usually necessary to employ somewhat elaborate circuit arrangements which functionally include at least a deflection signal generator, means for controlling the operating frequency of the oscillator through the application of a D. C. control potential and a phase comparator circuit which compares the phase and frequency of the developed deflection signal with received incoming synchronizing signals. The phase comparator means then developes a D. C. control potential for the deflection generator control means such as to maintain precise synchronism between the generator deflection signal and the incoming synchronizing signal. Many commercial adaptations of such an overall system include a plurality of tubes; for example, one may be used for the deflection signal or sawtooth generator; another two tubes used in a phase comparator circuit, and perhaps even another is required for D. C. amplification of the developed control signal. Although these tubes may be combined into a smaller number of single envelopes, their cost associated with the necessary and somewhat precision circuit components, including tuned circuit and the like, tend to make such time averaging circuits considerably more expensive to manufacture. Consequently, the advantages of a time averaging synchronizing system for television reception in many cases have been withheld from commercial use due to the higher cost of circuit manufacture.

The increased noise immunity obtainable in prior art time averaging deflection circuits is to a very large extent obtained at the expense of the speed of circuit response. That is to say, the output voltage of whatever type of phase comparator is used will usually contain evidences of unwanted noise signal and in order to keep this noise signal from effecting either the frequency or waveform of the generated deflection signal, a minimum time constant or circuit lag is found necessary between the phase detector and the deflection signal generator. This same time lag will, however, be also active upon changes in phase comparator output due to actual asynchronous operation and hence will impose a delay to the return of the system to synchronous operation. Moreover, in most prior art arrangements, the phase comparator means has been responsive to develop an erroneous control voltage for spurious noise signals occurring during any given deflection signal time interval.

In the overcoming of some of the disadvantages in the above recited prior art time averaging deflection systems, the present invention, in its broader aspects, contemplates the use of a time gated phase comparator circuit whose output voltage is employed to control the frequency of a self-excited signal generator or oscillator whose developed signal is in itself employed to time the gate of the phase comparator. A synchronizing signal is then applied to the gated phase comparator circuit for control of the self-excited oscillator. The time constant of the phase comparator output circuit is then maintained sufficiently low to permit waveform contour characteristics of both the self-excited oscillator and the synchronizing signal to be expressed in the output signal of the phase comparator. The phase comparator output signal is then, according to the present invention, employed as a control signal for a sawtooth deflection signal generator whose discharge time constant is sufficiently low to permit virtually complete discharge of the sawtooth condenser during predetermined intervals of the phase comparator signal output. In this way the linear rise time of the developed sawtooth signal is maintained substantially constant regardless of noise effects and the effects of spurious noise signal are restricted in their influence to the return time of the developed sawtooth deflection signal.

In one of its more specific forms, the present invention utilizes a single vacuum tube as a time average deflection signal generator, the vacuum tube being provided with a cathode, a control electrode, a screen electrode, a suppressor electrode, and an anode. A tuned circuit is then connected with the control grid and cathode of the tube in a typical Hartley oscillator circuit arrangement. The screen grid of the tube is then operated as the anode of the Hartley oscillator and the oscillatory pulses of current supplied thereto are utilized to control the charging and discharging of a capacitor connected with the screen electrode thereby producing sawtooth deflection signals. Since the frequency of a Hartley oscillator, under certain operating conditions, can be made sensitive to changes in anode potential (in this case, the screen electrode) circuit synchronization may be obtained by applying the synchronizing signals or pulses to the suppressor grid, which along with the discharge tube anode, may be statically biased at ground potential. Incoming positively extending synchronizing pulses occurring at a time during which the screen electrode is positive will then rob the screen of electrons and reduce the current thereto. This action, according to the present invention, changes the average screen potential to control the frequency of oscillation of the oscillator and thereby establish isochronism between the generated deflection signal and the incoming synchronizing signal.

It is therefore an object of the present invention to provide a novel form of deflection system for television cathode ray beam deflection arrangements.

It is another purpose of the present invention to provide a novel signal generator employing only a single tube exhibiting time averaging synchronizing action with regard to applied synchronizing signals and noise.

A still further object of the present invention resides in the provision of an improved time averaging deflection signal generator having self-gating properties for increasing noise immunity.

Another object of the present invention resides in the provision of a novel deflection signal generator adapted for synchronization by applied synchronizing signals such that the developed deflection signal is of a sawtooth variety whose return time is rendered variable in accordance with variations in the energy of the applied synchronizing signal.

It is a still further purpose of the present invention to provide a novel sawtooth deflection signal generator adapted for synchronization by applied synchronizing pulses such that the effect of undesirable noise signal is restricted in influence to the return time of the developed sawtooth waveform.

Another object of the present invention is to provide a time averaging deflection signal generator for television use which employs a self-excited sine wave oscillator directly controllable in frequency by variations in operating potentials, said variations being in turn controlled in accordance with information derived from a phase comparator circuit comparing the signal developed by the sine wave oscillator with a source of synchronizing control signal.

Another object of the present invention resides in the provision of an economical and efficient time averaging synchronized deflection circuit for a television receiving system, the synchronizing system being realizable through the use of only a single tube.

The novel features which are believed to be characteristic of the present invention are set forth in the appended claims. The invention itself, however, both to its organization and method of operation, as well as other objects and advantages, will be clearly understood from the teachings of the following description especially when taken in consideration with the accompanying drawings wherein:

Figure 1:
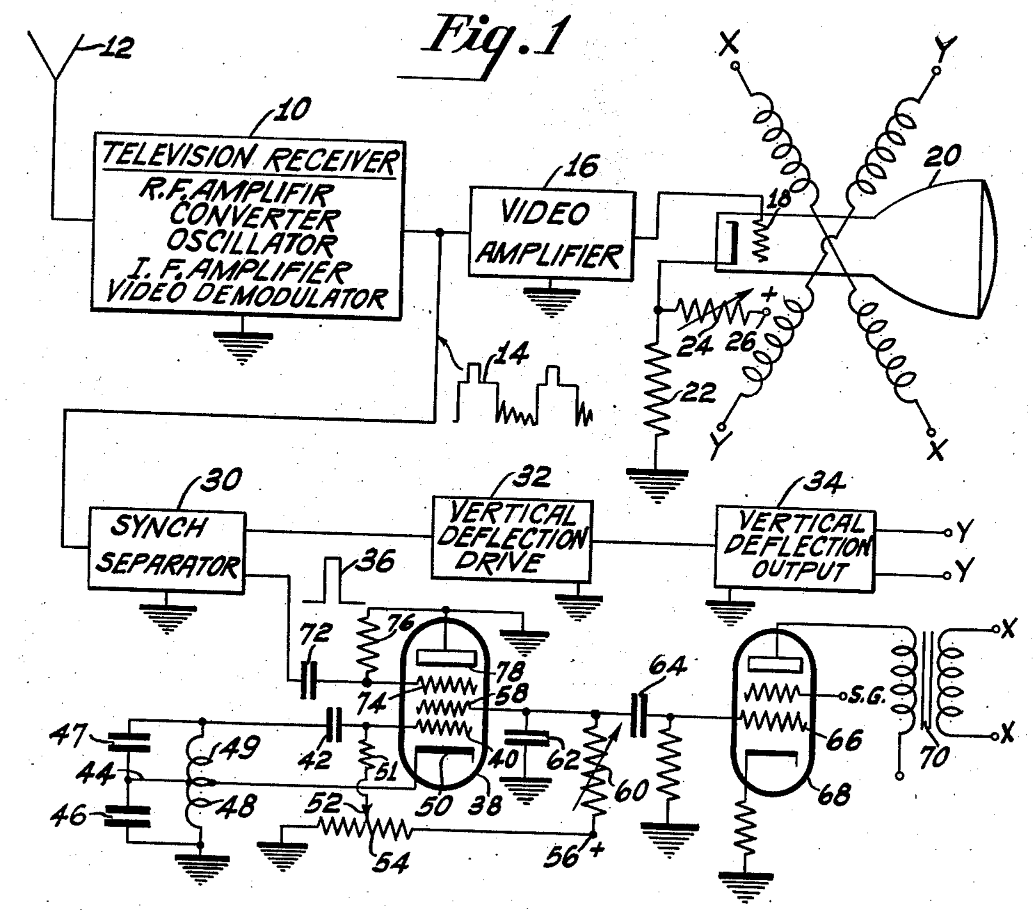
Figure 1 is a combination schematic and block diagram of a television system in which the present invention finds ready utilization.

Referring now to Figure 1 in the drawings, there is represented in block form at 10 some typical components of a television receiver which comprises an R. F. amplifier, a converter, an oscillator an I. F. amplifier, and video demodulator. Signals intercepted by the antenna 12 are thereby amplified and demodulated by the receiver conduits 10 to produce a composite video signal such as shown at 14. The video signal 14 is then applied to the video amplifier 16 whose output is supplied to the control electrode 18 of the cathode ray image reproducing tube 20. A cathode resistor 22 with a variable bleeder resistor 24 connected with a source of positive potential 26 provides a conventional brightness control arrangemnt for the picture tube 20. According to well known practice, the video signal 14 is also applied to a sync separator circuit, such as 30, which clips vertical and horizontal synchronizing pulses from the video signal 14 and respectively applies them to the vertical and horizontal deflection systems of the receiver. The vertical deflection drive circuit 32 is thereby supplied with vertical synchronizing signals from the sync separator 30, the output of the vertical deflection drive generator being applied to the vertical deflection output stage 34. The vertical deflection coils Y—Y, adjacent the picture tube 20, may then be connected across the output terminals Y—Y of the vertical deflection output stage 34. The clipped and separated horizontal synchronizing pulses such as 36 are then utilized for synchronization of the horizontal deflection generator comprising electron discharge tube 38.

According to the present invention, the discharge tube 38 has its control grid 40 capacitively coupled through capacitor 42 to a tuned circuit 44 having its other end grounded. The capacitors 46 and 47 and inductors 48 and 49 comprising the tuned circuit 44 are proportioned to resonate the circuit at a frequency which bears an integral relationship with the recurrence frequency of the incoming pulses 36. For example, in standard RMA television systems having interlaced 525 line definition, the overall resonant frequency of the tuned circuit may be 15,750 C. P. S., or as described hereinafter one of the tuned sections (47—49) may be tuned to 15,750 while the other section (46—48) may be tuned to any harmonic such as 31,500 C. P. S. The cathode 50 of the discharge tube 38 is then connected to a tap on the inductor 48—49 to provide a typical Hartley oscillator circuit arrangement. Static operating bias on the control grid 40 may be adjusted by means of the tap 52 on the potentiometer 54 connected across the positive power supply terminal 56 and ground potential. The screen grid 58 of the discharge tube is also connected with the positive power supply terminal 56 through the variable load resistor 60. A sawtooth discharge capacitor 62 is then connected from the screen grid 58 to ground and the sawtooth voltage variations appearing thereacross are coupled by means of capacitor 64 to the control grid 66 of a conventional horizontal deflection output stage including discharge tube 68. The resulting deflection signal is then shown as being transformer coupled by the output transformer 70 to the terminals X—X indicated for connection with the terminals X—X of the horizontal deflection coils. Although not shown, a shunt damping circuit for the horizontal deflection winding may be employed as described in an article entitled "Television Receivers" by Antony Wright appearing in the March 1947, issue of the RCA Review. To synchronize the deflection system, the separated horizontal synchronizing signals 36 are applied through coupling capacitor 72 to the suppressor grid 74 of the oscillator tube 38. A grid return 76 is shown for the suppressor 74, which statically biases the suppressor 74 at ground potential along with the anode 78.

The operation of the present invention is substantially as follows:

Upon circuit energization, a sustained signal having substantially sine waveform will be developed across a resonant circuit 44 due to the above described Hartley oscillator connection. Tube 38 will then carry pulses of current on each positive peak of the developed sine wave as applied to the grid 40. The signal waveform appearing across the tuned circuit and applied to the grid 40 is shown at 80 in Figure 2 curve *b*, whereas the resulting pulses of current within the tube 38 due to the positive peaks of this oscillation 80 are shown by the pulse 82 in Figure 2, curve *c*. In accordance with the connections shown, it is apparent that these pulses 82 will be conducted by the screen electrode 58 and provided the capacitor 62 is sufficiently small, a sawtooth of voltage will appear on the screen electrode 58 in accordance with the current pulses 82. This latter action develops from the charging of capacitor 62 through resistor 60 from the positive potential source 56 during the intervals between the pulses 82 whereas upon the occurrence of a pulse 82, current is drawn from the condenser resulting in a rather rapid drop in condenser voltage. The contour 84, Figure 2, curve *d*, represents the general form of sawtooth voltage appearing across the capacitor 62.

Figure 2:
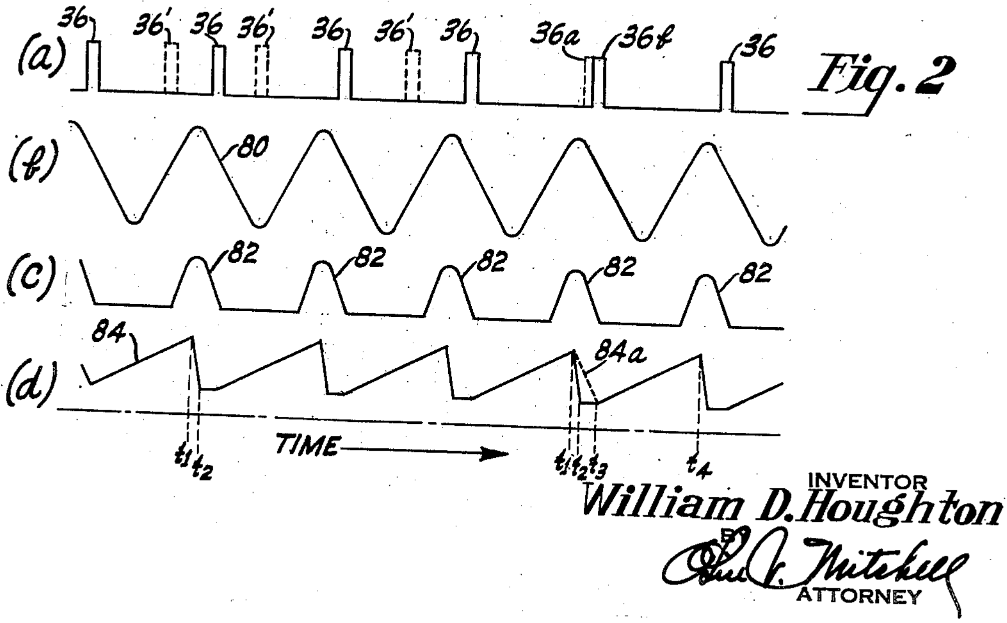
Figure 2 illustrates various waveforms which are peculiar to the operation of Figure 1.

For an understanding of just how time averaging synchronization of the oscillator action is achieved, it will be assumed that the oscillatory action is adjusted to be in synchronism with the arriving synchronizing pulse 36 as shown in curves *a*, *b*, and *c* of Figure 2. Under these conditions, and with proper phasing, the synchronizing pulse 36 will occur during the rear slope of the current pulse 82 and there will be developed on the screen grid 58 some average operating potential about which the screen will swing in accordance with the sawtooth voltage 84 in Figure 2*d*. It will be appreciated that during the interval of the positive extending synchronizing pulse 36 some electrons will be robbed from the screen electrode 58 and that the higher the instantaneous current of the screen at the time the synchronizing pulse 36 arrives, the greater the value of current robbed from the screen will be. Thus, if the oscillator tends to slow down relative to the synchronizing pulse 36, the synchronizing pulse will, in effect, rise up on the rear slope of the current pulse 82 and thus rob more electrons from the screen 58 and hence reduce the average current drawn thereby. This, of course, will raise the average voltage on the screen 58 which is, in fact, the anode of the Hartley oscillator. With this increase in screen voltage, the oscillator will increase in frequency due to the attendant increase in tube gm. Correspondingly, should the oscillator tend to increase in frequency relative to the synchronizing pulse, the synchronizing pulse 36 will in effect slide downward on the trailing edge of the current pulse 82 and hence fewer electrons will be robbed from the screen 58. This will result in a lower screen potential. The lower screen potential will of course reduce the Hartley oscillator gm and lower its frequency to compensate and correct the initial increase in oscillator frequency. Thus, it is seen that once the synchronizing pulse 16 occurs on the trailing edge of the current pulse 82, time averaging synchronization of the deflection circuit occurs with the sawtooth 84 being maintained in synchronism with the synchronizing pulse 36.

From the foregoing description of circuit operation, it is manifest that the noise immunity of the circuit will be inherently high due to the gating action of the current pulse 82. In other words, unless the tube 38 is in a conducting state, noise such as indicated by dotted pulses 36′ Figure 2(*a*) appearing at the suppressor 74 cannot in any way effect the developed sawtooth signal. Furthermore, during the beginning and end of the current pulse 82, the noise immunity will be greater than during the higher amplitude portions of the current pulse. If, however, a noise pulse, such as is shown in dotted lines at 36*a*, occurs just prior to, and extends into the interval normally occupied by synchronizing pulse 36*b*, the linear rise time $t3$—$t4$ of the sawtooth in curve 2*d* will not be in any way affected. This latter action comes by way of having adjusted the value of sawtooth capacitor 62 such that the capacitor is fully discharged between intervals $t1$—$t2$ of the sawtooth waveform 84. Once the capacitor 62 is discharged at the end of time $t2$, the voltage thereon remains substantially constant during the remaining portion $t2$—$t3$ of the current pulses 82. Any noise then occurring just prior to or after the sync pulse 36*b* will then only rob electrons from the screen 58 and reduce the rate of discharge of the capacitor 62. The dotted line portion 84*a* of curve 2*d* illustrates the delay in retrace time that might be occasioned by noise such as 36*a*. Hence, the noise immunity of the circuit is even greater than that provided by its inherent gating action and if noise does occur during the conduction periods of the tube, the noise will only appear as an irregularity on the right hand side of the television raster and will not in any way affect the character of the raster corresponding to the intervals $t3$—$t4$.

It is to be noted that the frequency sensitivity of the Hartley oscillator section of the circuit to changes in anode potential (the screen 58) will be enhanced by higher grid circuit impedances which characteristic of a Hartley oscillator is well known in the art. Should the mean frequency of the oscillator be necessarily changed the tap 52 on the potentiometer 54 may be varied thus changing the operating bias of the grid 40. The variable resistance 60 connected in series with the screen 58 may be made to act as a form of size control for the developed sawtooth deflection signal. In general, it has been found that it is desirable to limit the peaks of noise applied to the circuit so that they do not exceed the peak value of the synchronizing pulses. When this is done, the noise evidenced by irregulârties in screen raster due to missynchronism is small compared to the visible effects produced by noise signal modulation of the kinescope grid.

It has also been found experimentally that the circuit gives exceptionally good performance when the anode 38 is grounded as shown. The reason for this is that the robbing of electrons from the screen due to pulses of noise is made sufficiently small so that the filtering action of the capacitor 62 will efficiently remove the effects. It may in some cases be desirable to tune a section such as condenser 47 and 49 to a harmonic of the sync pulse frequency while the section comprising condenser 46 and inductance 48 maintain resonance at the fundamental frequency. In such cases the time during which tube 38 is rendered conductive is substantially decreased with an attendant increase in noise immunity.

In the practice of the present invention, the following circuit parametric values were found to give good operational performance:

In a standard television receiver—

| | |
|---|---|
| 38 | Tube type 6AC7 |
| 42 | .002 mf. |
| 46 | .0102 mf. |
| 47 | .0025 mf. |
| 48 | .10 mh. |
| 49 | 30 mh. |
| 51 | 2.2 megohms |
| 54 | 250,000 ohms |
| 56 | +300 volts |
| 60 | 250,000 ohms |
| 62 | 470 mmf. |
| 72 | .01 mf. |
| 76 | 4.7 megohms |

It is to be understood that although specific examples of circuit arrangements and parametric values have been indicated, the invention itself is in no way limited to these specific embodiments and that the specific nature and detail of the examples given are merely intended to add clarity to the disclosure and aid in the obtaining of a more complete understanding of the invention, as well as in its successful reduction to practice.

What is claimed is:

1. Apparatus for generating sawtooth deflection waves in synchronism with reference pulses and comprising in combination: a source of reference pulses, an oscillator including an intermittently conducting amplifier having a first and a second electrode, a first direct current path between said first and second electrodes including a load impedance and a source of potential so connected as to make said second electrode positive with respect to said first electrode, means including a capacitor connected between said first and second electrodes for producing a sawtooth wave, and means connected to said source of reference pulses and coupled into said second direct current path for simultaneously increasing the flow of electrons in said second path and decreasing the flow of electrons in said first path in response to the occurrence of said reference pulses.

2. Apparatus for generating sawtooth deflection waves in synchronism with reference pulses and comprising in combination: a source of reference pulses, an oscillator including an intermittently conducting amplifier having an anodic element and a cathode, a first direct current path between said anodic element and said cathode including a load impedance and a source of potential so connected as to make said anodic element positive with respect to said cathode, means including a capacitor connected between said anodic element and said cathode for producing a sawtooth wave, and means connected to said source of reference pulses and coupled into said second direct current path for simultaneously increasing the flow of electrons in said second path and decreasing the flow of electrons in said first path in response to the occurrence of said reference pulses.

3. Apparatus for generating sawtooth deflection waves in synchronism with reference pulses and comprising in combination: a source of reference pulses, an intermittently conducting electron tube having a first, a second, a third, and a fourth electrode, a resonant circuit connected between said first and second electrodes, a first direct current path between said first and third electrodes including a load impedance and a source of potential so connected as to make said third electrode positive with respect to said first electrode, means including a capacitor connected between said first and third electrodes for producing a sawtooth wave, and means for simultaneously increasing the flow of electrons in said second path and decreasing the flow of electrons in said first path in response to the occurrence of said reference pulses, said last named means including a connection between said source of reference pulses and said fourth electrode.

4. Apparatus for generating sawtooth deflection waves in synchronism with reference pulses and comprising in combination: a source of reference pulses, an intermittently conducting electron tube having a cathode, a control grid, a screen grid, a suppressor grid and an anode, a resonant circuit connected between said cathode and said control grid, a first direct current path between said cathode and said screen grid including a load impedance and a source of potential so connected as to make said screen grid positive with respect to said cathode, means including a capacitor connected between said cathode and said screen grid for producing a sawtooth wave, and means for simultaneously increasing the flow of electrons in said second path and decreasing the flow of electrons in said first path in response to the occurrence of said reference pulses, said last named means including a connection between said source of reference pulses and said suppressor grid.

References Cited in the file of this patent

UNITED STATES PATENTS

| Number | Name | Date |
|---|---|---|
| 2,387,685 | Sanders | Oct. 23, 1945 |
| 2,408,061 | Grieg | Sept. 24, 1946 |
| 2,506,679 | Oswald | May 9, 1950 |
| 2,519,000 | Smeltzer | Aug. 15, 1950 |